United States Patent [19]

Wilson

[11] Patent Number: 4,626,481
[45] Date of Patent: Dec. 2, 1986

[54] COMMON ELECTROLYTE MANIFOLD BATTERY

[75] Inventor: J. Pierre Wilson, San Jose, Calif.

[73] Assignee: Altus Corporation, San Jose, Calif.

[21] Appl. No.: 793,795

[22] Filed: Nov. 1, 1985

[51] Int. Cl.[4] .................. H01M 2/38; H01M 6/14
[52] U.S. Cl. ......................... 429/18; 429/72;
429/210; 429/119; 429/194
[58] Field of Search ................ 429/18, 72, 210, 194,
429/119; 204/228, 267, 268, 269, 275

[56] References Cited

U.S. PATENT DOCUMENTS

| | | | |
|---|---|---|---|
| 3,005,864 | 10/1961 | Sharpe | 429/119 |
| 3,258,366 | 1/1962 | Di Pasquale et al. | 429/119 |
| 3,472,699 | 10/1969 | Jackley et al. | 429/119 X |
| 3,563,804 | 2/1971 | Garcin et al. | 429/119 |
| 3,630,782 | 12/1971 | Butler | 429/7 |
| 3,634,139 | 1/1972 | Reiser | 429/13 |
| 3,804,673 | 4/1974 | Butler | 429/176 |
| 3,964,929 | 6/1976 | Grevstad | 429/26 |
| 4,279,732 | 7/1981 | Bellows | 429/18 X |
| 4,371,433 | 2/1983 | Balko et al. | 429/18 X |
| 4,377,445 | 3/1983 | Grimes | 429/18 X |
| 4,548,874 | 10/1985 | Katz | 429/18 |

Primary Examiner—Anthony Skapars
Attorney, Agent, or Firm—Limbach, Limbach & Sutton

[57] ABSTRACT

A common electrolyte manifold battery that includes at least one module having a plurality of cells, at least one common electrolyte manifold traversing the cells for transporting a low conductivity electrolyte, an anode and a cathode. The one module includes a collector plate, the collector plate has an end exposed to the common electrolyte manifold, and one of the cells. The one cell comprises a first bipolar plate, positioned in parallel with the collector plate, that has an end proximal to the manifold and an end distal to the manifold, the distal end being connected to the anode. In addition, a second bipolar plate is provided, positioned parallel with the anode plate, that has an end proximal to the manifold and an end distal to the manifold, the distal end being connected to the cathode. The one cell further comprises a layer of insulator enveloping each of the proximal end of the first bipolar plate and the second bipolar plate. The insulator layers are contiguous with the common electrolyte manifold, wherein each of the insulator layers has an anode portion that is directed toward the anode and a cathode portion that is directed toward the cathode, whereby the collector plate exposed end minimizes voltage imbalance of the one cell, the insulator layers minimize short circuiting of the one cell, and the low conductivity electrolyte minimizes leakage currents.

23 Claims, 4 Drawing Figures

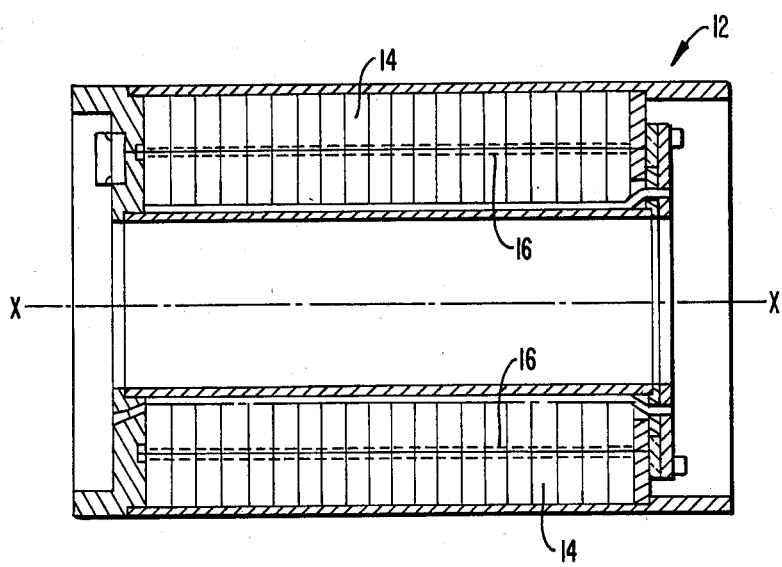
FIG._1.
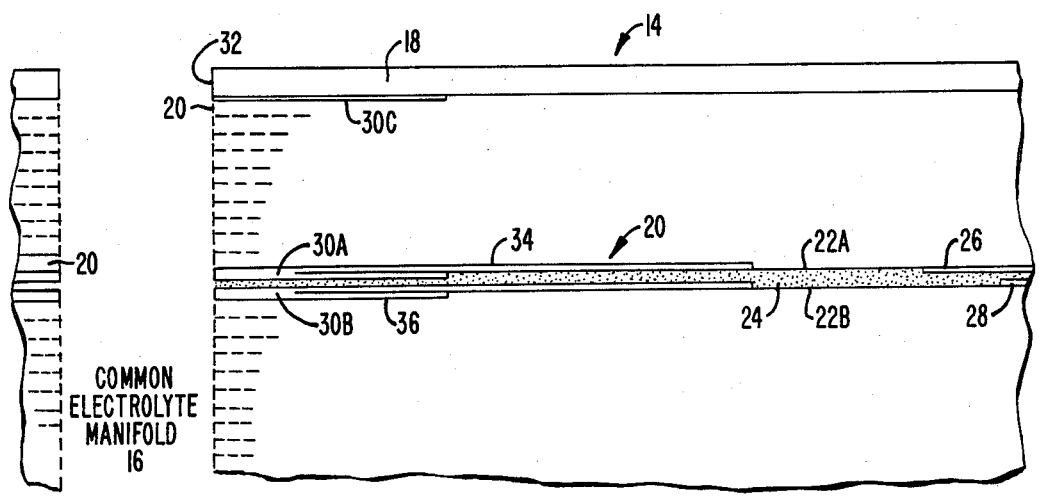
FIG._2.

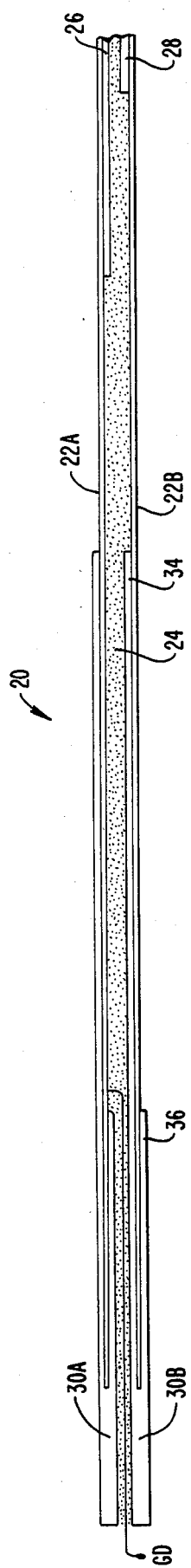
FIG._3.
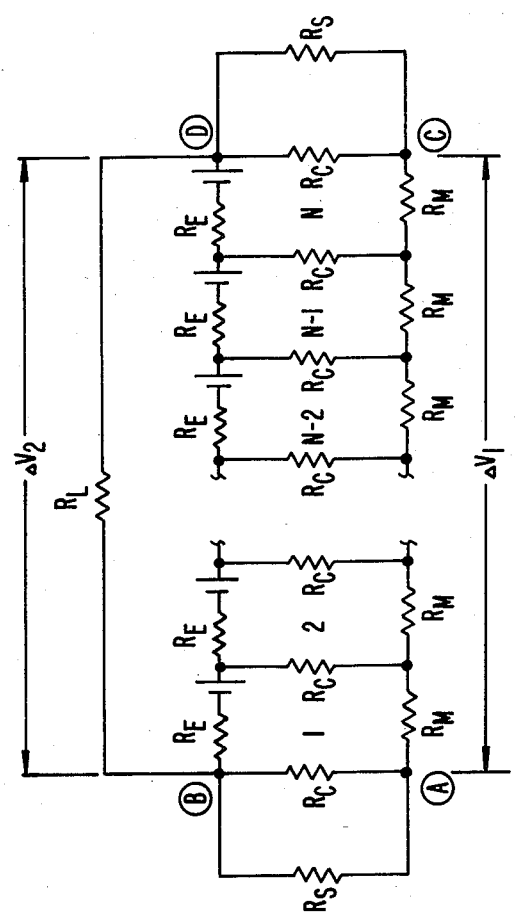
FIG._4.

COMMON ELECTROLYTE MANIFOLD BATTERY

TECHNICAL FIELD

This invention relates to batteries, and more particularly, to a common electrolyte manifold battery.

BACKGROUND ART

Common electrolyte manifold batteries are common in the art. In such batteries, leakage currents are invariably present which cause the degradation of a battery's efficiency and ultimately lead to the self-discharge of the battery. Minimizing leakage currents, therefore, is an attribute sought by the inventors of prior art batteries. In addition to the leakage current problem, short circuiting of the bipolar-plate stack is also an inevitable consequence. Short circuiting of the bipolar plates occurs because dendrites have grown to such an extent that two adjacent plates are bridged. Minimizing or retarding the growth of such dendrites is also a desired goal of prior art battery inventors.

To alleviate these disadvantages, prior art techniques included either filling each battery cell individually with a compressed gas or ventilating the electrolyte manifold with such a compressed gas in order to eliminate leakage currents. These techniques, in turn, are not efficient in that the resultant manifold arrangement tended to be rather complex when individual cells are required to be filled. In addition, the ventilation or blowing out of the manifold not only reduced the sensitivity of the battery as to its orientation but also created difficulties in controlling the leaking of the electrolyte back into the manifold. Thus, the two goals of minimizing internal electrical losses and retarding growth of dendrites were not readily achieved in the prior art.

DISCLOSURE OF THE INVENTION

An ideal common electrolyte manifold battery having bipolar-plate stack configuration should be capable of not only minimizing the presence of leakage currents but also retarding the growth of dendrites.

It is a major object of present invention to provide a common electrolyte manifold battery that minimizes internal electrical losses.

It is another object of the present invention to provide a common electrolyte manifold battery that minimizes the formation of dendrites, thereby minimizing the potential for electrical short circuiting.

It is a further object of the present invention to provide a common electrolyte manifold battery that is capable of manipulating the growth of dendrite at a harmless location, thereby preventing electrical short circuiting.

In order to accomplish the above and still further objects, the present invention provides a common electrolyte manifold battery that includes at least one module having a plurality of cells, at least one common electrolyte manifold traversing the cells for transporting a low conductivity electrolyte, an anode and a cathode. The one module includes a collector plate, the collector plate has an end exposed to the common electrolyte manifold, and one of the cells. The one cell comprises a first bipolar plate, positioned in parallel with the collector plate, that has an end proximal to the manifold and an end distal to the manifold, the distal end being connected to the anode. In addition, a second bipolar plate is provided, positioned parallel with the anode plate, that has an end proximal to the manifold and an end distal to the manifold, the distal end being connected to the cathode. The one cell further comprises a layer of insulator enveloping each of the proximal end of the first bipolar plate and the second bipolar plate. The insulator layers are contiguous with the common electrolyte manifold, wherein each of the insulator layers has an anode portion that is directed toward the anode and a cathode portion that is directed toward the cathode, whereby the collector plate exposed end minimizes voltage imbalance of the one cell, the insulator layers minimize short circuiting of the one cell, and the low conductivity electrolyte minimizes leakage currents.

Other objects, features, and advantages of the present invention will appear from the following detailed description of the best mode of a preferred embodiment, taken together with the accompanying drawings.

BRIEF DESCRIPTION OF THE DRAWINGS

FIG. 1 is a simplified, cross section view of a common electrolyte manifold battery of the present invention;

FIG. 2 is a partial, enlarged cross section view of the common electrolyte manifold battery of FIG. 1;

FIG. 3 is a partial, enlarged cross section view of the common electrolyte manifold battery of FIG. 2; and FIG. 4 is a schematic representation of the common electrolyte manifold battery of FIGS. 1-3.

BEST MODE FOR CARRYING OUT THE INVENTION

Referring to FIG. 1, there is shown a common electrolyte manifold battery, designated 12. Battery 12 in the preferred embodiment is a lithium-thionyl chloride ($Li/SOCl_2$) reserve-activated, bipolar, common static electrolyte battery. Battery 12 consists of twenty modules 14 each having 86 cells arranged in an annular configuration. Modules 14 are arranged about an axis "X." Traversing through the battery stack of modules 14 are two common electrolyte manifolds 16, shown as dotted lines in FIG. 1, which are parallel to axis "X" of battery 12. In the preferred embodiment, each manifold 16 has a diameter of approximately ⅛ inch.

More particularly, each battery module 14, as best shown in FIG. 2, includes a collector plate 18 and 86 cells 20. As best shown in FIG. 3, each cell 20 comprises a pair of bipolar plates 22A and 22B. Positioned between bipolar plates 22A and 22B is a separator 24. Positioned contiguous to one end of bipolar plates 22A and 22B, the ends which are distal to one of the two common electrolyte manifolds 16, are anode 26 and cathode 28. Positioned at the other end of bipolar plates 22A and 22B, at the end adjacent to common electrolyte manifold 16, are insulation layers 30A and 30B which envelop plates 22A and 22B, respectively. In addition, a layer of insulator 30C is positioned contiguous to collector plate 18, as best shown in FIG. 2.

In the preferred embodiment, bipolar plates 22A and 22B are manufactured from nickel clad copper material. Each of bipolar plates 22A and 22B has a thickness of approximately 2.5 mils in the preferred embodiment. Separator 24 is manufactured from a porous material such as ceramic or fiberglass paper that prevents the direct contact of anode 26 and cathode 28 while permitting ionic conduction between anode 26 and cathode 28. Separator 24 has an uninstalled thickness of approximately 20.0 mils in the preferred embodiment. Moreover, anode 26 is manufactured from a lithium material and cathode 28 porous carbon. In the preferred embodiment, anode 26 has a thickness of approximately 3-4 ½ mils, and cathode 28 has an uninstalled thickness of approximately 17-19 mils. The total thickness of each cell 20 is approximately 0.0145 inch in the preferred embodiment.

The electrolyte used, flowing from manifold 16 into porous separator 24, is a thionyl chloride ($SOCl_2$) solvent having lithium tetrachloralumate ($LiAlCl_4$) and aluminum trichloride ($AlCl_3$) salts. The chemical reaction is as follows. First, lithium metal of anode 26 is oxidized, yielding lithium ion, $$4Li \rightarrow 4Li^+ + e^-.$$

At cathode 28, the $SOCl_2$ solvent is reduced, producing chloride ions, elemental sulfur and sulfur dioxide, $$4e^- + 2SOCl_2 \rightarrow 4Cl^- + S + SO_2.$$

The overall chemical reaction is $$4Li + 2SOCl_2 \rightarrow 2LiCl + S + SO_2.$$

In designing a common electrolyte manifold battery, the two primary considerations are (1) leakage current which degrades battery efficiency, leading to self discharge of the battery; and (2) the formation of elemental lithium which, if it bridges anode 26 and cathode 28, will lead to short circuiting. The consequences of short circuiting a cell are catastropic in that they generally result in a thermal runaway situation, leading eventually to the venting of the battery.

Since the energy loss associated with the leakage current in manifold 16 of the present invention is relatively modest in light of the fact that the conductivity of the electrolyte is relatively low, e.g., 55-60 ohm-centimeter, the loss of energy is generally in the range of ½ to 1% of the total energy produced by battery 12.

To analyze the second consideration, the schematic illustrated in FIG. 4 is useful in explaining the present invention. In the circuit diagram, $R_e$ represents the cell resistance of one cell 20, $R_m$ represents the electrolyte resistance in manifold 16, and $R_c$ represents the electrolyte resistance in going from manifold 16 to an active cell 20, also referred to as the channel resistance. $R_l$ represents the external load resistance and $R_s$ represents the shunt resistance. In the preferred embodiment, the shunt resistance is provided by collector plate 18. Collector plate 18 in the preferred embodiment has a thickness of approximately 10 mils.

Since short circuiting is dependent on both the electrical contact between anode 26 and cathode 28 at different voltage potentials and the growth of lithium dendrites, the present invention minimizes these two factors. First, since the growth of dendrites is dependent on the totality of the channel currents, the channel currents may be reduced by shunted collector plate 18 and the channel geometry. The reduction in channel currents may be achieved either by reducing the voltage drop across the channel resistance, $R_c$, or by increasing the resistance $R_c$.

Theoretically, the channel currents can be driven to zero if the voltage drop in manifold 16 ($\Delta V_1$) is made equal to the voltage drop in the battery stack ($\Delta V_2$). As best shown in FIGS. 2 and 3, this is accomplished by exposing end 32 of collector plate 18 so as to create a low shunt resistance $R_s$ which in turn causes the voltage at nodes "A" and "B" to be equal and the voltage at nodes "C" and "D" to be equal. Furthermore, assuming the $R_m$'s and the $R_e$'s are equal for each cell 20, the voltage drop across any $R_c$ is zero. Whereas the maximum channel currents are approximately 8.2 milliamps, a shunt resistance of 40 ohms reduces the maximum channel currents to approximately 0.7 milliamps. Thus, exposed end 32 of collector plated 18 minimizes the voltage imbalance of of cell 20.

As for channel geometry, the channel resistance, $R_c$, may be increased by minimizing the the space of each channel by employing insulators 30A and 30B. Insulators 30A and 30B are manufactured from a polytetrafluoroethylene (Teflon) material. Insulators 30A and 30B are bonded to the plates by using standard cyanoacrylate adhesives.

To minimize the possibility of lithium dendrites bridging bipolar plates 22A and 22B, insulators 30A and 30B of different diameters are used. Since lithium dendrites nucleate at anode plate 22A and grow in the direction of the channel current, i.e., towards manifold 16, a longer insulator on cathode 28 would prevent the dendrites from coming into contact with a bare cathode plate 22B. The growth of dendrites is illustrated in FIG. 3 by the arrow "GD." As best shown in FIG. 3, each of insulators 30A and 30B has its cathode portion 34 greater than its anode portion 36. In essence, the dendrites are manipulated to nucleate or grow at a harmless location on anode plate 22A such that it cannot come into contact with cathode plate 22B, which is protected by the longer cathode portion 34 of insulator 30B. In the preferred embodiment, both insulators 30A and 30B are approximately 2.0 mils in thickness. The diameter of the cathode side is approximately 1.0 inch and the anode side 0.5 inch. Although bipolar plates 22A and 22B are also referred to as anode plate 22A and cathode plate 22B, respectively, each of bipolar plates 22A and 22B is identical. They are described in this fashion so as to simplify their functions. In actuality, each of bipolar plates 22A and 22B is in contact with anode 26 and cathode 28. In addition, each of bipolar plates 22A and 22B is either the cathode plate or anode plate for an adjacent cell 20. For example, bipolar plate 22A is illustrated as being in contact with anode 26 in FIGS. 2-3 and is referred to as an anode plate. However, it serves as the cathode plate for the next adjacent cell 20 because its other surface is in contact with cathode 28, not shown. Similarly, bipolar plate 22B is illustrated as a cathode plate in FIGS. 2-3. It, however, serves as the anode plate for the next adjacent cell 20 because its other surface is in contact with anode 26, not shown.

In operation, a bipolar stack of 20 modules, each having 86 cells, is used to generate 180 kilowatts of energy. If none of the attributes are utilized, the battery would vent in approximately 1.7 to 2.6 minutes. If Teflon insulators 30A and 30B of equal lengths are used, venting will occur at approximately 7.6 to 8.5 minutes. If Teflon insulators 30A and 30B of equal lengths and shunted collectors 18 are used, venting will occur after approximately 34.4 minutes. Last, if all the attributes of the present invention are used—insulators 30A and 30B each having longer cathode portion 34, and shunted collectors 18, venting does not occur at all within 24 hours, the maximum test time.

It will be apparent to those skilled in the art that various modifications may be made within the spirit of the invention and the scope of the appended claims.

What is claimed is:

1. A common electrolyte manifold battery, said battery including at least one module having a plurality of cells, at least one common electrolyte manifold traversing said cells for transporting an electrolyte, an anode and a cathode, said one cell comprising an anode plate having an end proximal to said manifold and an end distal to said manifold, said distal end being connected to said anode;

a cathode plate, positioned parallel with said anode plate, having an end proximal to said manifold and an end distal to said manifold, said distal end being connected to said cathode; and a layer of insulator enveloping each of said proximal end of said anode plate and said cathode plate, said insulator layers being contiguous with said common electrolyte manifold, whereby short circuiting of said one cell is minimized.

2. The common electrolyte manifold battery as claimed in claim 1, wherein each of said insulator layers has an anode portion that is directed toward said anode and a cathode portion that is directed toward said cathode.

3. The common electrolyte manifold battery as claimed in claim 2, wherein said anode portion and said cathode portion of each of said insulator layers are of unequal lengths.

4. The common electrolyte manifold battery as claimed in claim 2 or 3, wherein said electrolyte has a low conductivity so as to minimize leakage currents.

5. The common electrolyte manifold battery as claimed in claim 4, wherein said electrolyte comprises a thionyl chloride ($SOCl_2$) solvent having lithium tetrachloralumate ($LiAlCl_4$) and aluminum trichloride ($AlCl_3$) salts.

6. A common electrolyte manifold battery, said battery including at least one module having a plurality of cells, at least one common electrolyte manifold traversing said cells for transporting an electrolyte, an anode and a cathode, said one module including a collector plate, and one of said cells, said one cell comprises an anode plate, positioned in parallel with said collector plate, having an end proximal to said manifold and an end distal to said manifold, said distal end being connected to said anode;

a cathode plate, positioned parallel with said anode plate, having an end proximal to said manifold and an end distal to said manifold, said distal end being connected to said cathode; and a layer of insulator enveloping each of said proximal end of said anode plate and said cathode plate, said insulator layers being contiguous with said common electrolyte manifold, whereby said collector plate and said insulator layers minimize short circuiting of said one cell.

7. The common electrolyte manifold battery as claimed in claim 6, wherein each of said insulator layers has an anode portion that is directed toward said anode and a cathode portion that is directed toward said cathode.

8. The common electrolyte manifold battery as claimed in claim 7, wherein said anode portion and said cathode portion of each of said insulator layers are of unequal lengths so as to manipulate the growth direction of dendrites.

9. The common electrolyte manifold battery as claimed in claim 6, 7 or 8, wherein said insulator layers minimize channel currents.

10. The common electrolyte manifold battery as claimed in claim 9, wherein said electrolyte has a low conductivity so as to minimize leakage currents.

11. The common electrolyte manifold battery as claimed in claim 10, wherein said electrolyte comprises a thionyl chloride ($SOCl_2$) solvent having lithium tetrachloralumate ($LiAlCl_4$) and aluminum trichloride ($AlCl_3$) salts.

12. The common electrolyte manifold battery as claimed in claim 6, wherein said collector plate has an end exposed to said common electrolyte manifold so as to minimize the voltage imbalance of said one cell.

13. The common electrolyte manifold battery as claimed in claim 12, wherein said electrolyte has a low conductivity so as to minimize leakage currents.

14. The common electrolyte manifold battery as claimed in claim 13, wherein said electrolyte comprises a thionyl chloride ($SOCl_2$) solvent having lithium tetrachloralumate ($LiAlCl_4$) and aluminum trichloride ($AlCl_3$) salts.

15. A common electrolyte manifold battery, said battery including at least one module having a plurality of cells, at least one common electrolyte manifold traversing said cells for transporting a low conductivity electrolyte, an anode and a cathode, said one module including a collector plate, said collector plate having an end exposed to said common electrolyte manifold, and one of said cells, said one cell comprises a first bipolar plate, positioned in parallel with said collector plate, having an end proximal to said manifold and an end distal to said manifold, said distal end being connected to said anode;

a second bipolar plate, positioned parallel with said anode plate, having an end proximal to said manifold and an end distal to said manifold, said distal end being connected to said cathode; and a layer of insulator enveloping each of said proximal end of said first bipolar plate and said second bipolar plate, said insulator layers being contiguous with said common electrolyte manifold, wherein each of said insulator layers has an anode portion that is directed toward said anode and a cathode portion that is directed toward said cathode, whereby said collector plate exposed end minimizes voltage imbalance of said one cell, said insulator layers minimize short circuiting of said one cell, and said low conductivity electrolyte minimizes leakage currents.

16. The common electrolyte manifold battery as claimed in claim 15, wherein said anode portion and said cathode portion of each of said insulator layers are of unequal lengths, said cathode portion being longer than said anode portion, so as to manipulate the growth direction of dendrites.

17. The common electrolyte manifold battery as claimed in claim 15, 16 or 17, wherein said insulator layers minimize short circuiting of said one cell by reducing channel currents.

18. The common electrolyte manifold battery as claimed in claim 17, wherein said insulator layers comprise a polytetrafluoroethylene material.

19. The common electrolyte manifold battery as claimed in claim 18, wherein said electrolyte comprises a thionyl chloride ($SOCl_2$) solvent having lithium tetrachloralumate ($LiAlCl_4$) and aluminum trichloride ($AlCl_3$) salts.

20. The common electrolyte manifold battery as claimed in claim 19, wherein said anode comprises a lithium material.

21. The common electrolyte manifold battery as claimed in claim 20, wherein said cathode comprises a porous carbon material.

22. The common electrolyte manifold battery as claimed in claim 21 further comprising a separator positioned intermediate said first bipolar plate and said second bipolar plate, said separator is in communication with said common electrolyte manifold and is capable of receiving said electrolyte.

23. The common electrolyte manifold battery as claimed in claim 22, wherein said separator comprises a porous material.

* * * * *